United States Patent
Wu

(10) Patent No.: US 8,903,140 B2
(45) Date of Patent: Dec. 2, 2014

(54) FINGERPRINT INDENTIFYING SYSTEM

(76) Inventor: Jen-Chieh Wu, Pingtung County (TW)

(*) Notice: Subject to any disclaimer, the term of this patent is extended or adjusted under 35 U.S.C. 154(b) by 1042 days.

(21) Appl. No.: 12/456,588

(22) Filed: Jun. 17, 2009

(65) Prior Publication Data
US 2010/0172552 A1    Jul. 8, 2010

(30) Foreign Application Priority Data
Jan. 7, 2009 (TW) .............................. 98100345 A

(51) Int. Cl.
*G06K 9/00* (2006.01)
(52) U.S. Cl.
CPC .................................. *G06K 9/00013* (2013.01)
USPC .......................................................... 382/124
(58) Field of Classification Search
CPC .......... G06K 9/00019; G06K 9/00026; G06K 9/00084; G06K 9/00065; G06K 9/00013
See application file for complete search history.

(56) References Cited

U.S. PATENT DOCUMENTS

| 5,177,802 A | 1/1993 | Fukimoto et al. |
| 5,448,649 A * | 9/1995 | Chen et al. .................... 382/126 |
| 5,619,586 A * | 4/1997 | Sibbald ........................ 382/127 |

* cited by examiner

Primary Examiner — Kim Vu
Assistant Examiner — Fred Hu
(74) Attorney, Agent, or Firm — Shimokaji & Associates P.C.

(57) ABSTRACT

A fingerprint identifying system includes a finger press plate, an image-capturing unit, a light-diffusion member, at least one microstructure layer, and a light source. The light-diffusion member is disposed below the finger press plate and above the image-capturing unit, and has a through hole in alignment with the image-capturing unit. The microstructure layer is disposed on the light-diffusion member. The light source is disposed below the light-diffusion member and around the image-capturing unit.

2 Claims, 6 Drawing Sheets

FINGERPRINT INDENTIFYING SYSTEM

CROSS-REFERENCE TO RELATED APPLICATION

This application claims priority of Taiwanese Application No. 098100345, filed on Jan. 7, 2009.

BACKGROUND OF THE INVENTION

1. Field of the Invention

The invention relates to a fingerprint identifying system, more particularly to a fingerprint identifying system which is simplified in an assembly procedure and which has an improved identification rate.

2. Description of the Related Art

Referring to FIG. 1, a conventional fingerprint identifying system includes an image-capturing unit 11, a finger press plate 12, a light-diffusion plate 13 disposed between the image-capturing unit 11 and the finger press plate 12, and a plurality of light sources 14 disposed below the light-diffusion plate 13. The finger press plate 12 has a press surface 121 for disposing a finger (A) thereon. The light-diffusion plate 13 guides the light from the light sources 14 so as to serve as a planar light source transmitting light toward the finger press plate 12, and has a through hole 131 in alignment with the image-capturing unit 11. When the light from the light-diffusion plate 13 illuminates the finger (A) disposed on the press surface 121 of the finger press plate 12, the light illuminating the grooves of the finger (A) is reflected from the press surface 121 to the image-capturing unit 11 through total internal reflection, and the light illuminating the ridges of the finger (A) will be absorbed by the finger (A) so as to create a fingerprint image, which is dark where there are ridges and bright where there are grooves.

However, since there is the through hole 131 in the light-diffusion plate 13, the light illuminating the center portion of the finger (A) is less than that illuminating the remainder of the finger (A). Therefore, the center portion of the finger (A) has an unsatisfactory illumination, which results in an unsatisfactory fingerprint identification rate.

Referring to FIG. 2, a fingerprint identifying system 2 disclosed in U.S. Pat. No. 5,177,802 includes an image pickup device 21, a light guide plate 22 disposed above the image pickup device 21, and two light sources 23 disposed at two sides of the lightguide plate 22, respectively. When light emitted from the light sources 23 enters into the lightguide plate 22, the light is guided by the lightguide plate 22 to a finger (B) through total internal reflection. The light is then reflected on the contour of the fingerprint pattern of the finger (B) and reaches the image pickup device 21 to form an image of the fingerprint.

However, in the fingerprint identifying system 2, in order to permit the light from the light sources 23 to be guided by the lightguide plate 22 at accurate angles for creating the total internal refection, the assembly angle of the light sources 23 relative to the lightguide plate 22 is strictly limited. Therefore, the yield of the fingerprint identifying system 2 may be reduced due to the error of the assembly angles of the light sources 23 relative to the lightguide plate 22.

SUMMARY OF THE INVENTION

Therefore, an object of the present invention is to provide a fingerprint identifying system which is simplified in an assembly procedure and which has an improved identification rate.

Accordingly, the fingerprint identifying system of this invention includes a finger press plate, an image-capturing unit, a light-diffusion member, at least one microstructure layer, and a light source. The light-diffusion member is disposed below the finger press plate and above the image-capturing unit, and has a through hole in alignment with the image-capturing unit. The microstructure layer is disposed on the light-diffusion member. The light source is disposed below the light-diffusion member and around the image-capturing unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
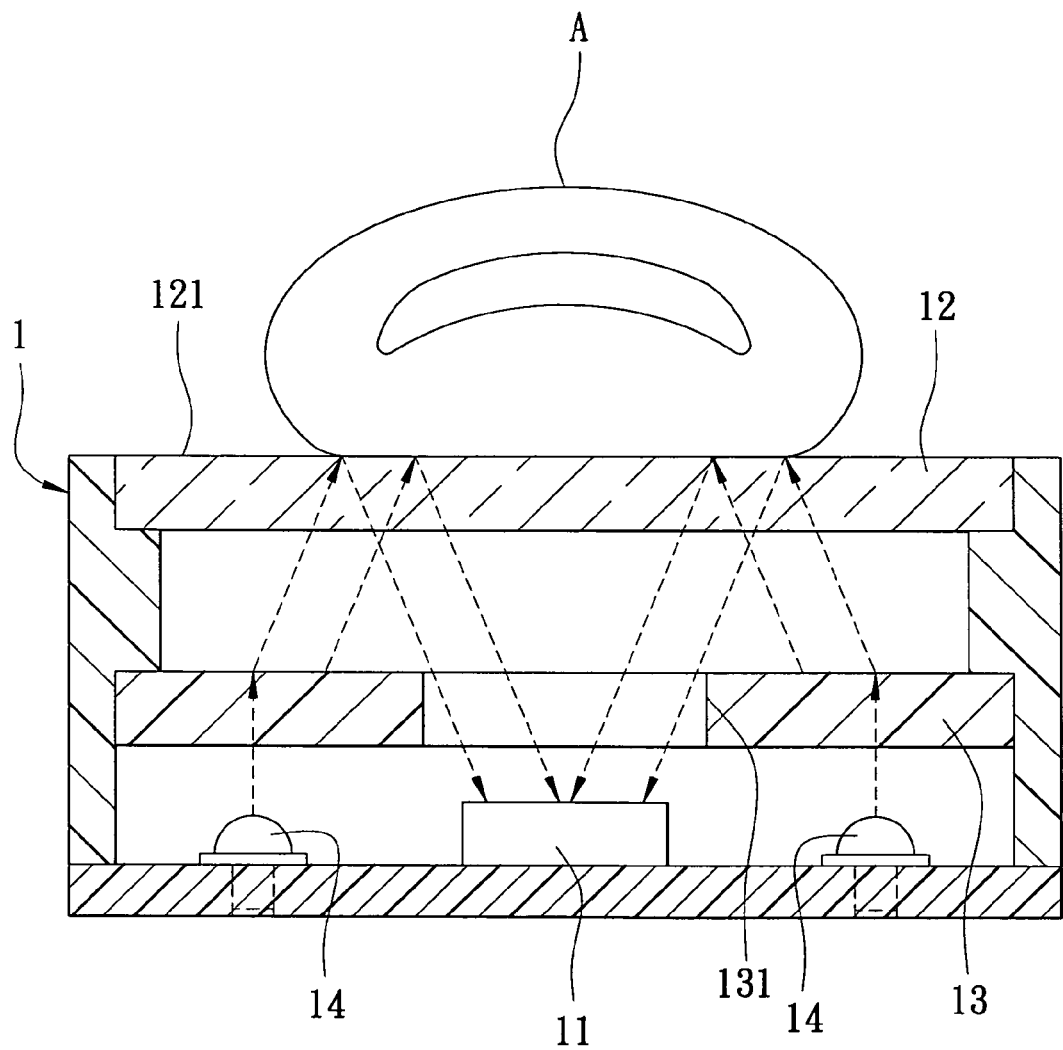
FIG. 1 is a sectional view of a conventional fingerprint identifying system.
Figure 2:
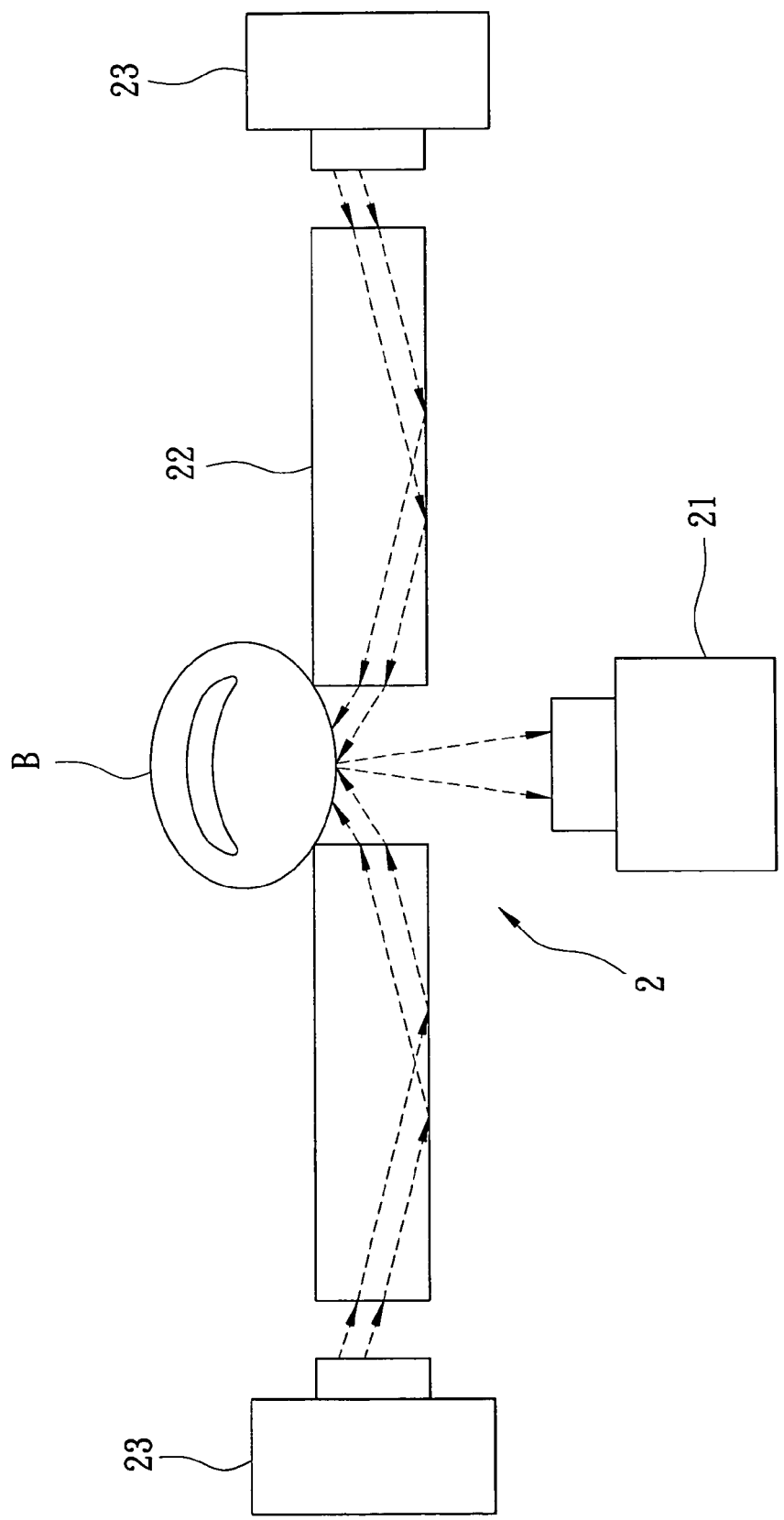
FIG. 2 is a schematic view of another conventional fingerprint identifying system.
Figure 3:
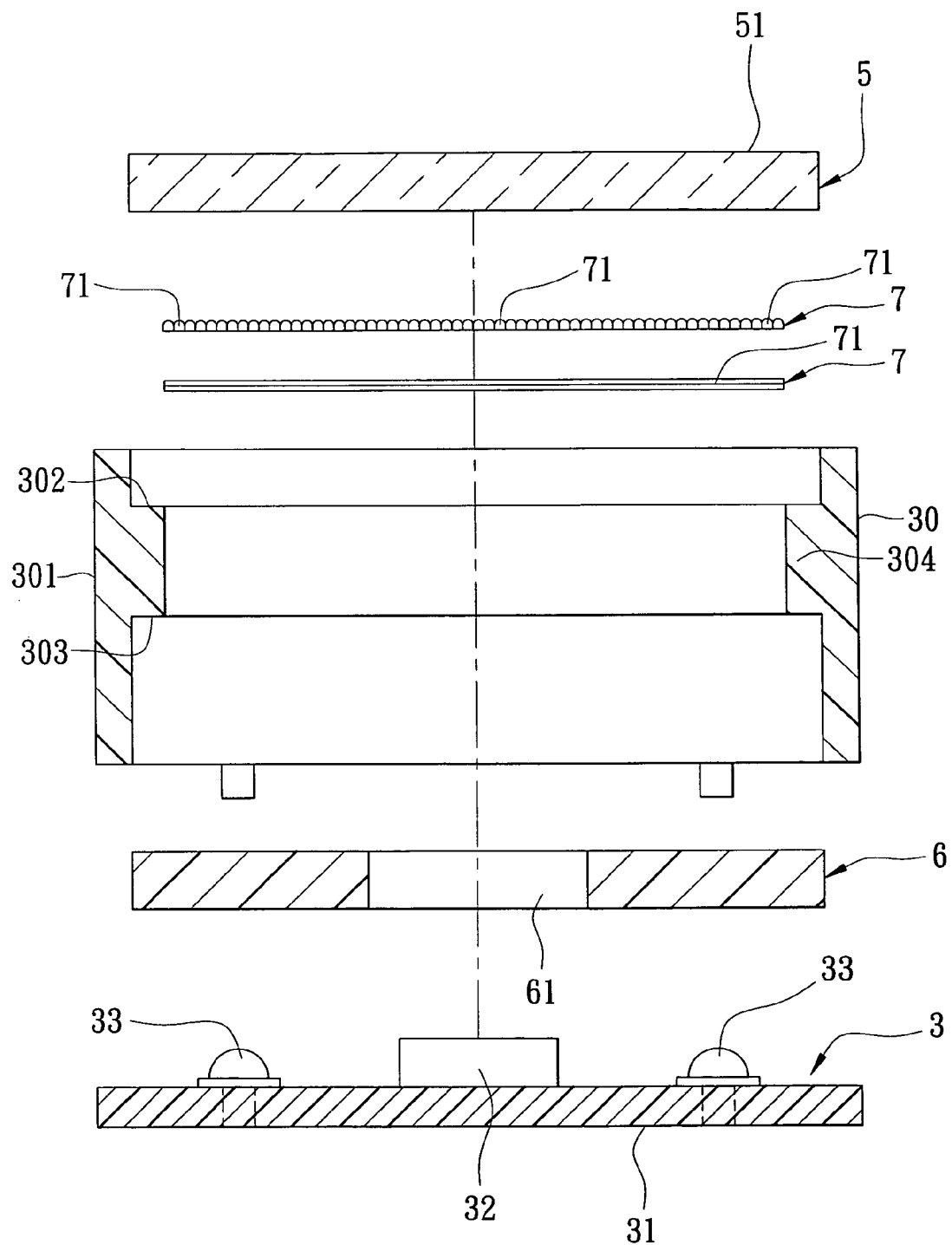
FIG. 3 is an exploded sectional view of a first preferred embodiment of a fingerprint identifying system according to this invention.
Figure 4:
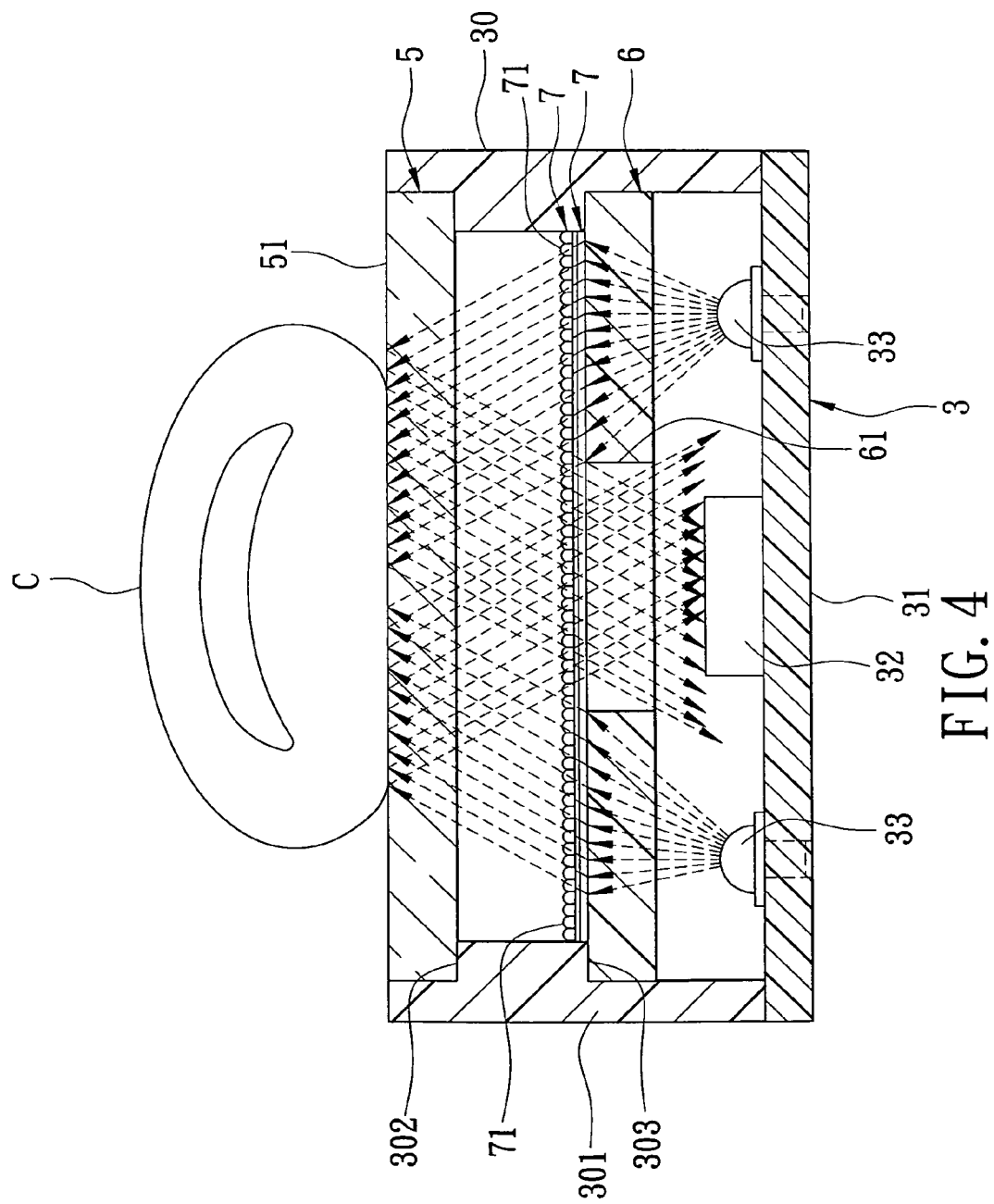
FIG. 4 is a sectional view of the first preferred embodiment.

Referring to FIGS. 3 and 4, the first preferred embodiment of a fingerprint identifying system 3 according to this invention includes a housing 30, a circuit board 31 disposed below and connected to the housing 30, an image-capturing unit 32 disposed on the circuit board 31, and a plurality of light sources 33 disposed on the circuit board 31 around the image-capturing unit 32. The housing 30 includes a surrounding wall 301 surrounding the image-capturing unit 32 and the light sources 33, and a flange 304 projecting inwardly from the surrounding wall 301 and having a bottom surface 303 facing toward the circuit board 31 and a top surface 302 opposite to the bottom surface 303. In this embodiment, LED lamps are used as the light sources 33.

The fingerprint identifying system 3 further includes a finger press plate 5, a light-diffusion member 6, and a pair of microstructure layers 7.

The finger press plate 5 used in this embodiment is made of a glass plate, is disposed on the top surface 302 of the flange 304, and has a top surface 51 for disposing a finger to be identified thereon.

The light-diffusion member 6 used in this embodiment is made of a light-transmissive acrylic plate, and is connected to the bottom surface 303 of the flange 304. Specifically, the light-diffusion member 6 is disposed below the finger press plate 5 and above the image-capturing unit 32, and has a through hole 61 in alignment with the image-capturing unit 32.

Each of the microstructure layers 7 includes a plurality of microstructures 71 disposed on top of the light-diffusion member 6. The microstructures 71 include indentations and protrusions, which are of V-shaped cross-section, trapezoid cross-section, semi-circular cross-section, etc. The microstructure layers 7 face the finger press plate 5 and are stacked on top of the light-diffusion member 6 in such a manner that the microstructures 71 of one of the microstructure layers 7 are transverse to the microstructures 71 of the other of the microstructure layers 7. The microstructure layers 7 may be formed separately from the light-diffusion member 6 or may be formed directly on and integrally with the light-diffusion member 6.

When the light sources 33 emit light to the light-diffusion member 6, the light-diffusion member 6 guides the light from the light sources 33 so as to serve as a planar light source to transmit the light toward the finger press plate 5 through the microstructure layers 7. Since the microstructure layers 7 include a plurality of microstructures 71, the light from the light-diffusion member 6 can be refracted via the microstructures 71 of the microstructure layers 7 so as to homogeneously scatter the light out of the microstructure layers 7 to the finger press plate 5. Therefore, the whole area of the top surface 51 of the finger press plate 5 has a satisfactory illumination for identifying the fingerprint.

When the light from the microstructure layers 7 illuminates the finger (C) disposed on the top surface 51 of the finger press plate 5, the light illuminating the grooves of the finger (C) is reflected from the top surface 51 through total internal reflection and passes through the through hole 61 of the light-diffusion member 6 to the image-capturing unit 32, and the light illuminating the ridges of the finger (C) will be absorbed by the finger (C) so as to create a fingerprint image, which is dark where there are ridges and bright where there are grooves.

It should be noted that the configuration and the density of the microstructures 71 of the microstructure layers 7 can be specified according to the practical requirement so as to obtain an optimal illumination for identifying the fingerprint.

Figure 5:
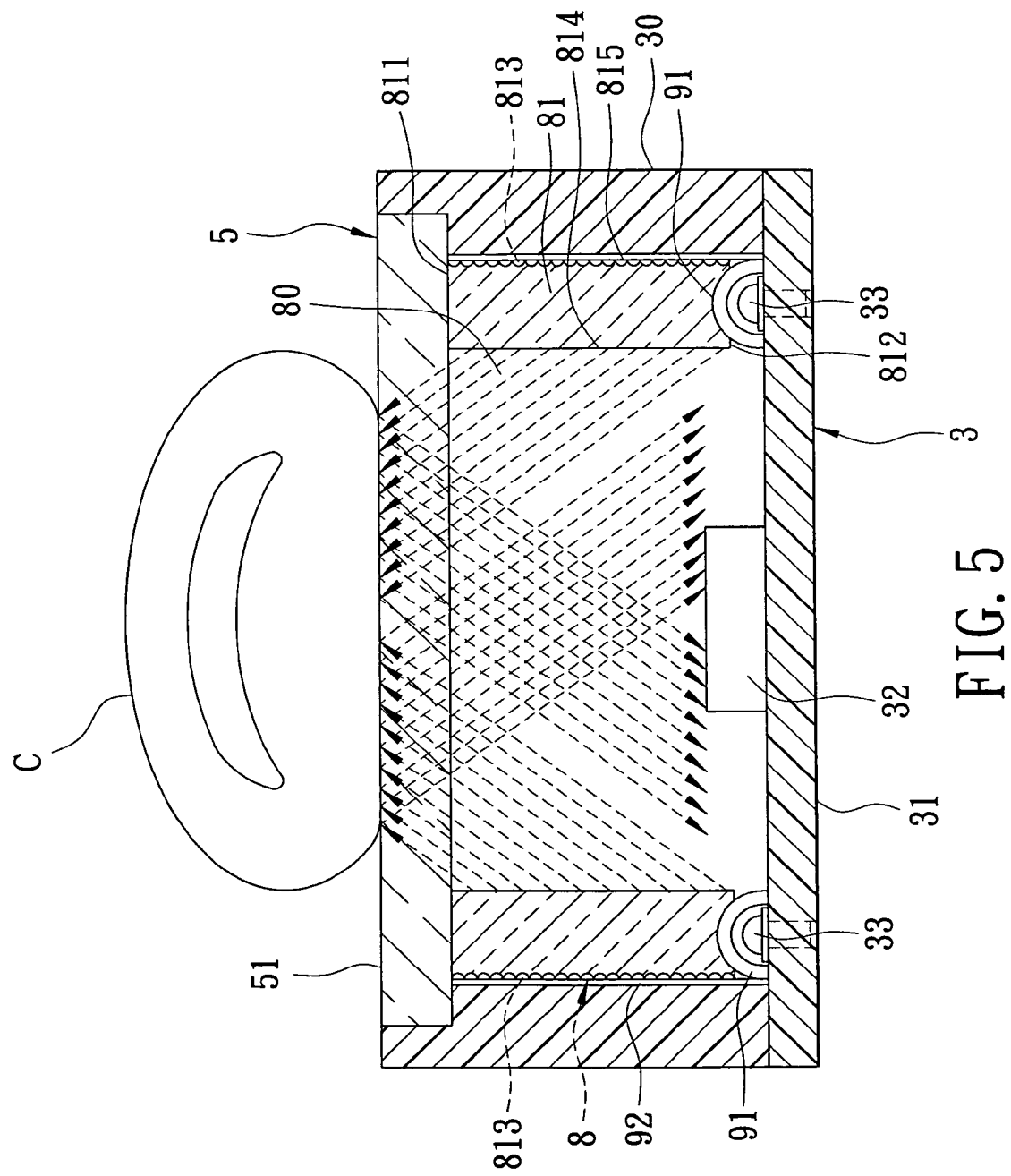
FIG. 5 is a sectional view of a second preferred embodiment of a fingerprint identifying system according to this invention.
Figure 6:
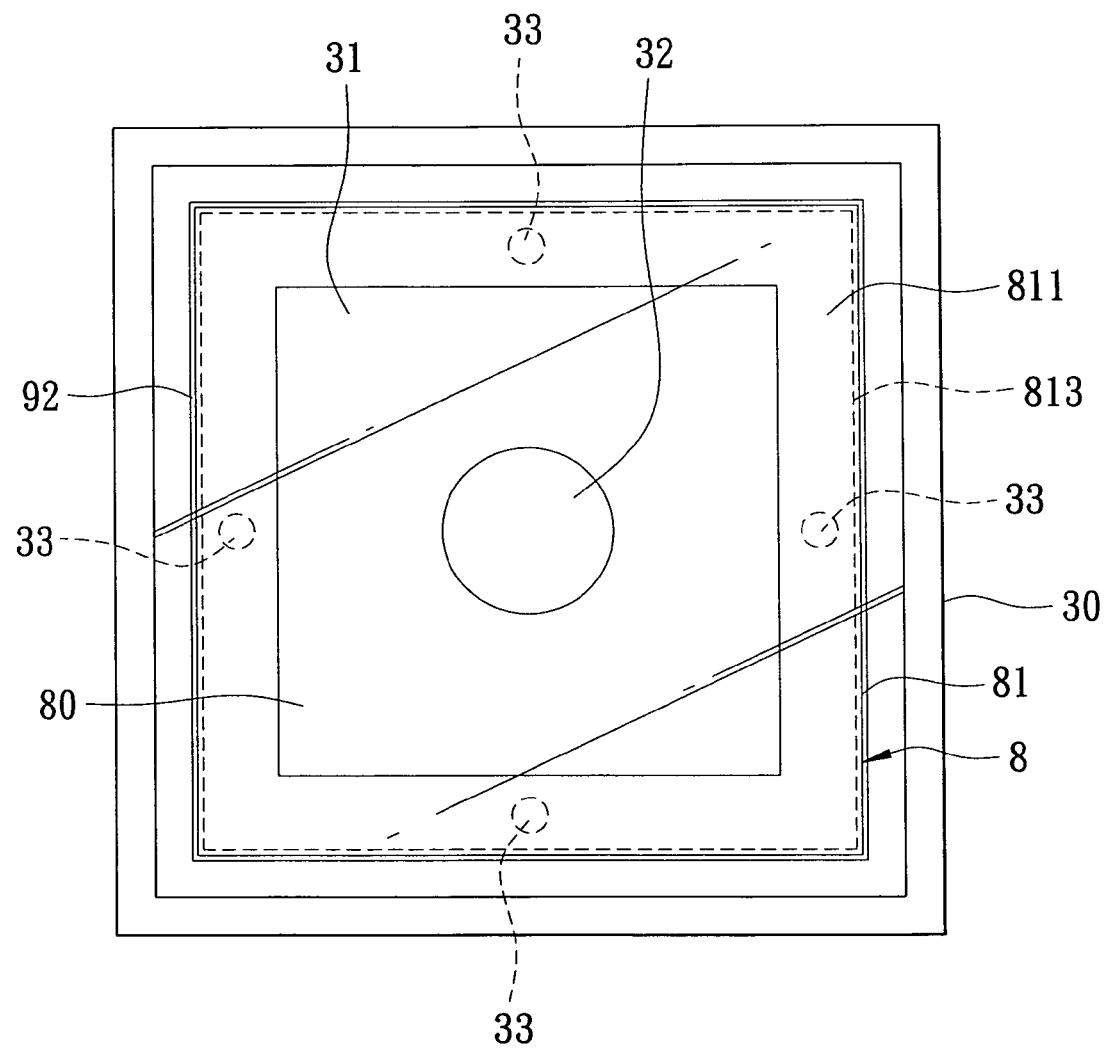
FIG. 6 is a top view of the second preferred embodiment.

Referring to FIGS. 5 and 6, the second preferred embodiment of a fingerprint identifying system 3 according to this invention is substantially similar to the first preferred embodiment except that the second preferred embodiment further includes a plurality of optical couplers 91 and a reflective layer 92 and that the light-diffusion member 8 is tubular.

The light-diffusion member 8 includes a surrounding wall 81 which has a top end 811 connected to the finger press plate 5, a bottom end 812 extending to the light sources 33 and serving as a light entrance end for the light sources 33, an inner periphery 814 confining the through hole 80, and an outer periphery 815 surrounding the inner periphery 814. The microstructure layer 813 extends over the outer periphery 815. The image-capturing unit 32 extends into the through hole 80. The optical couplers 91 are disposed between the bottom end 812 of the light-diffusion member 8 and the light sources 33. The reflective layer 92 is disposed on the microstructure layer 813 and is spaced from the light-diffusion member 8 by the microstructure layer 813.

When the light emitted from the light sources 33 is transmitted into the light-diffusion member 8 through the optical couplers 91 and the bottom end 812 of the light-diffusion member 8, the light is transmitted through total internal reflection to the microstructure layer 813, and the light scatters out of the microstructure layer 813 to the finger press plate 5. Therefore, the whole area of the top surface 51 of the finger press plate 5 has a satisfactory illumination for identifying the fingerprint.

It should be noted that the light utilization efficiency can be increased by using the reflective layer 92 to reflect the light emitted to the outer periphery 815 of the light-diffusion member 8.

When the light from the microstructure layer 813 illuminates the finger (C) disposed on the top surface 51 of the finger press plate 5, the light illuminating the grooves of the finger (C) is reflected from the top surface 51 through total internal reflection and passes through the through hole 80 of the light-diffusion member 8 to the image-capturing unit 32, and the light illuminating the ridges of the finger (C) will be absorbed by the finger (C) so as to create a fingerprint image, which is dark where there are ridges and bright where there are grooves.

In view of the above description, the fingerprint identifying system 3 of the present invention has the following advantages:

1. Since the light-diffusion member 6, 8 serves as a planar light source, the assembly position and angle of the light sources 33 is not strictly limited. Therefore, the fingerprint identifying system 3 of the present invention can be assembled in a simple and convenient manner, and the production cost thereof can be reduced.

2. The use of the microstructure layer 7, 813 can homogeneously scatter light to the finger press plate 5 such that the fingerprint identification rate can be enhanced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A fingerprint identifying system comprising:
   a finger press plate;
   an image-capturing unit;
   a light-diffusion member having a through hole in alignment with said image-capturing unit;
   at least one microstructure layer disposed on said light-diffusion member and below said finger press plate;
   a light source module disposed below said light-diffusion member and around said image-capturing unit; and
   a reflective layer disposed on said microstructure layer and spaced from said light-diffusion member by said microstructure layer;
   wherein said light-diffusion member has a top end directly contacted with said finger press plate and a bottom end directly contacted with said light source module, said through unit passes through said light-diffusion member from the top end to the bottom end, an inner side surface forms said through hole, an outer side surface surrounds said inner side surface, said microstructure layer is disposed on and contacted with said outer side surface, and said inner side surface surrounds said image-capturing unit.

2. The fingerprint identifying system according to claim 1, wherein the light source module comprises a light source and an optical coupler, and said optical coupler is disposed between said bottom end of said light-diffusion member and said light source.

* * * * *